(12) United States Patent
Guderzo

(10) Patent No.: US 7,382,235 B2
(45) Date of Patent: Jun. 3, 2008

(54) UNIT FOR CONTROLLING THE OPERATING FUNCTIONS OF A CYCLE

(75) Inventor: Gianfranco Guderzo, Arzignano (IT)

(73) Assignee: Campagnolo S.r.l., Vicenza (IT)

( * ) Notice: Subject to any disclaimer, the term of this patent is extended or adjusted under 35 U.S.C. 154(b) by 1019 days.

(21) Appl. No.: 10/805,713

(22) Filed: Mar. 22, 2004

(65) Prior Publication Data

US 2004/0220002 A1 Nov. 4, 2004

(30) Foreign Application Priority Data

Mar. 21, 2003 (EP) .................... 03425180

(51) Int. Cl.
*B62J 3/00* (2006.01)
(52) U.S. Cl. .................... 340/432; 340/815.9
(58) Field of Classification Search ........... 340/432, 340/463, 815.4, 815.83, 815.89, 815.9; 700/19, 700/83, 90; 280/288.4, 1.14; 74/502.2, 74/473.3; 116/56
See application file for complete search history.

(56) References Cited

U.S. PATENT DOCUMENTS

| | | | |
|---|---|---|---|
| 3,496,500 A | 2/1970 | Romary | 335/205 |
| 4,037,186 A | 7/1977 | Palmer et al. | 335/206 |
| 4,740,905 A * | 4/1988 | Murakami et al. | 702/96 |
| 6,012,353 A * | 1/2000 | Kawakami | 74/502.2 |
| 6,406,049 B1 * | 6/2002 | Jimison et al. | 280/288.4 |
| 2001/0027495 A1 * | 10/2001 | Campagnolo | 709/248 |
| 2004/0225380 A1 | 11/2004 | Guderzo | 700/19 |

FOREIGN PATENT DOCUMENTS

| | | |
|---|---|---|
| DE | 3203845 A1 | 11/1983 |
| EP | 0 661 912 A2 | 12/1994 |
| EP | 1238902 A | 9/2002 |
| FR | 2609578 A1 | 7/1988 |
| FR | 2678781 A1 | 1/1993 |
| GB | 2056684 A | 3/1981 |
| IT | TO2000A000293 | 3/2000 |
| JP | 10112358 | 4/1998 |

* cited by examiner

*Primary Examiner*—Van T. Trieu
(74) *Attorney, Agent, or Firm*—Volpe and Koenig PC

(57) ABSTRACT

A unit of a system for controlling the operating functions of a cycle is able to co-operate functionally with at least one complementary unit by at least one electrical connection. At least one of either the unit and the complementary unit is configured to be selectively removable from the cycle, so that the electrical connection is an electrical connection that can be decoupled by leaving exposed on the unit at least one distal contact part. Associated to the at least one electrical connection is a switch, which can be selectively actuated for electrically insulating the exposed distal contact part from the unit.

26 Claims, 4 Drawing Sheets

UNIT FOR CONTROLLING THE OPERATING FUNCTIONS OF A CYCLE

FIELD OF INVENTION

The present invention relates to control systems for cycles, particularly competition bicycles, although the invention is not limited to racing bicycles.

BACKGROUND

In the last few years, manufacturers developed cycling electronic control systems that control different functions. These control systems receive and process information gathered by sensors of different sorts, and obtain information regarding the operation and running conditions of the cycle.

These electronic control systems allow a user to control actuators of different sorts for modifying, according to given criteria and by acting both in an automatic way and via specific commands issued by the user, the operation/running conditions of the cycle. In particular, known controlled electrical actuators control the gear shift and the derailleur shift of a cycle.

Display units that allow a user to interact with the control unit are necessary for setting variables in the control unit. These display units contain a processor with storage capacity for storing information that may comprise sensitive information regarding the user and the user's cycle.

It is, therefore, useful to manufacture removable display units so that they can be separated from the electronic control system. When removed, however, it is important that the control system remain fixed on the cycle but protects the electrical connection points present on said "fixed" units from water, dust, impact, and tampering.

Exposure to the elements may jeopardize operation of the system and contribute to discharging the batteries of the units. Furthermore, the exposure of said contacts to the external environment may lie at the basis of phenomena of electrostatic shock, which are able to jeopardize operation of sensitive components, such as microprocessors comprised in the system.

SUMMARY

The object of the present invention is to overcome the drawbacks outlined above and to propose a solution that enables insulation of the connection points and contacts when the display unit is removed. To this end, a unit electrically connected to, and selectively removable from, a complementary unit is provided. The unit controls the operating functions of a cycle so that said electrical connection can be decoupled by leaving exposed at least one distal contact part on both of said units. The electrical connection is at least one switch that can be selectively actuated for electrically insulating said exposed distal contact part from either of said units.

BRIEF DESCRIPTION OF THE DRAWING(S)

DETAILED DESCRIPTION OF THE PREFERRED EMBODIMENT(S)

Figure 1:
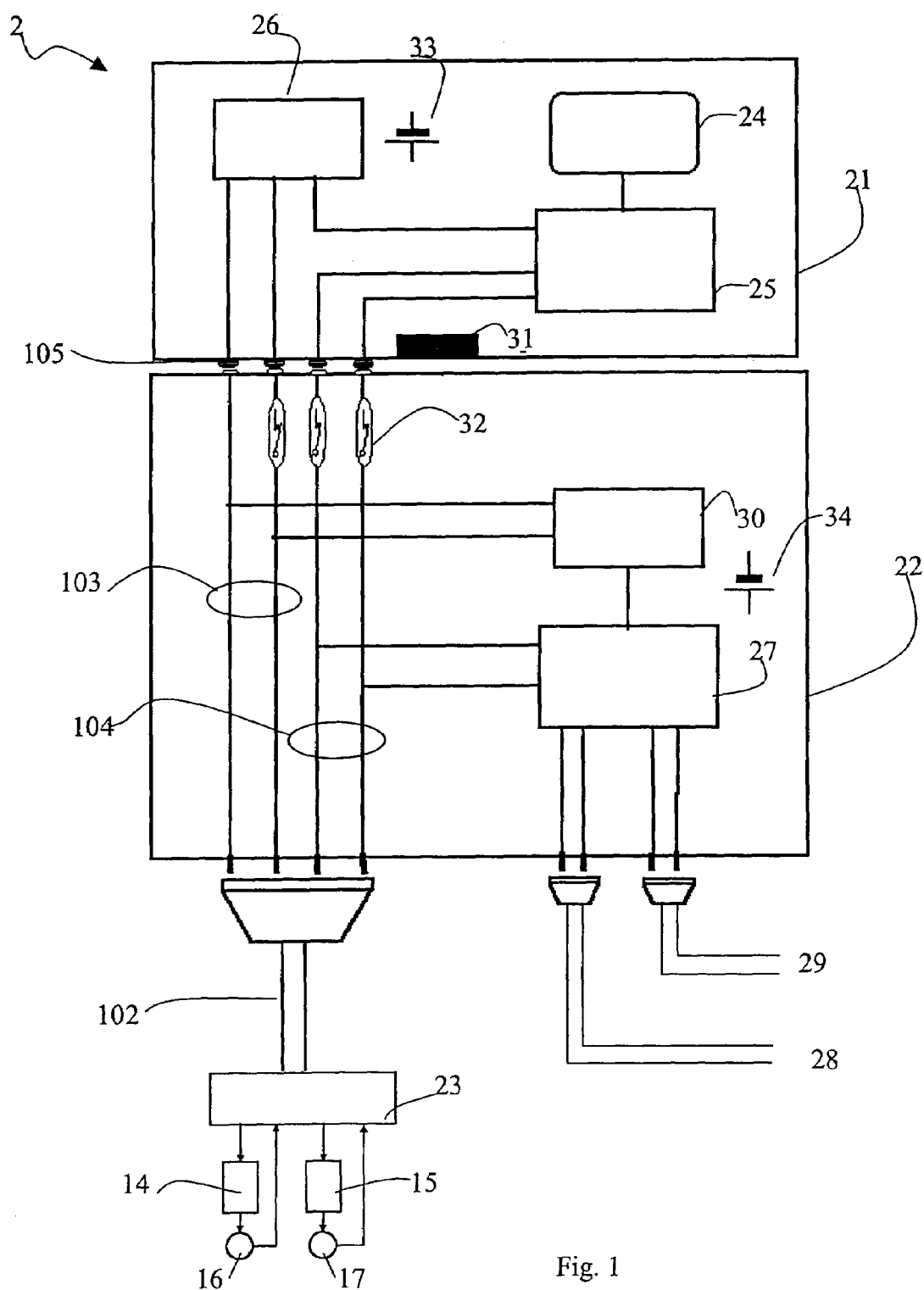
FIG. 1 is a schematic circuit diagram of a system for controlling the operating functions of a cycle according to the invention in a first configuration of operation.

FIG. 1 illustrates a partial block diagram of a system 2 for controlling the operating functions of a cycle (not shown in the drawings). In general terms, such a system is described in the Italian Patent Application TO2000A000293 to the assignee of the current application (which corresponds to U.S. patent application Ser. No. 09/805,113 and publication number US2001-0027495 assigned to Campagnolo S.r.l.), which is incorporated by reference as if fully set forth.

The system 2 comprises a display unit 21, a control unit 22, and a power unit 23. The control unit 22 and the power unit 23 are preferably fixedly mounted on the cycle. The display unit 21 is, in contrast, removably mounted to the cycle.

The power unit 23 provides for management of the positioning requests for the gearshift and for the derailleur, and controls the operation of a gear-shift actuator 14 and a derailleur-shift actuator 15, both of which are associated with respective position transducers 16 and 17.

Said position transducers 16 and 17 provide the information on the position of the gearshift and of the derailleur-shift to the power unit 23 so as to enable optimal control of the actuators 14 and 15 and execution of procedures, such as zero-setting of the position of the actuators and compensation for drifts or offsets of this position.

The power unit 23 supplies the control unit 22 by means of a connection 102 coming under a supply bus 103, with associated a communication bus 104. A connection 105 extends the buses 103 and 104 to the display unit 21. The connection 105 is decouplable, i.e., it is detachable, to enable removal of the display unit 21, separating it from the rest of the system.

The connection 105 is realized by a suitable four-conductor male-female connector or else by sliding contacts, so as to have contacts 107 on the control unit 22 and corresponding contacts 108 on the display unit 21. Said contacts are represented schematically in FIGS. 2 and 4 only.

A microprocessor 27 is connected in parallel on the communication bus 104. The microprocessor 27 has inputs 28 and 29 for receiving respective controls corresponding to the gearshift and to the derailleur-shift. The microprocessor 27 thus provides for forwarding said commands, through the communication bus 104, to the power unit 23. The control unit 22 comprises an auxiliary supply circuit 30, which monitors operation of an auxiliary battery 34 for the microcontroller 27.

The display unit 21 comprises a display 24, driven by a microprocessor 25. The microprocessor 25 is designed for performing the cycle-computer functions and for communicating, by means of the communication bus 104, with the control unit 22.

An auxiliary supply circuit 26 monitors, in a known way, operation of an auxiliary battery 33 for the microcontroller 25.

The display unit 21 further comprises a magnet 31 located in the proximity of the connection 105. Three magnetic switches 32, preferably of the reed-switch variety, are activatably closed by proximity to the magnet 31. These switches are placed on the communication bus 104 and on one of the conductors of the supply bus 103. Consequently, when the display unit 21 is mounted on the cycle, the magnet 31 keeps the magnetic switches 32 closed. When the display unit 21 is removed, the magnet 31 mounted on it moves away from the magnetic switches 32 and the magnetic switches 32 open. When the switch is open, the distal ends 107 of the lines are insulated from contact.

Consequently, the possible exposure of said distal ends 107 to the external environment and to external agents is not able to have any influence on the control unit 22 (or on the power unit 23 since the aforesaid distal ends 107 are physically separated and isolated from the units 22 and 23 mounted on the cycle.

Figure 2:
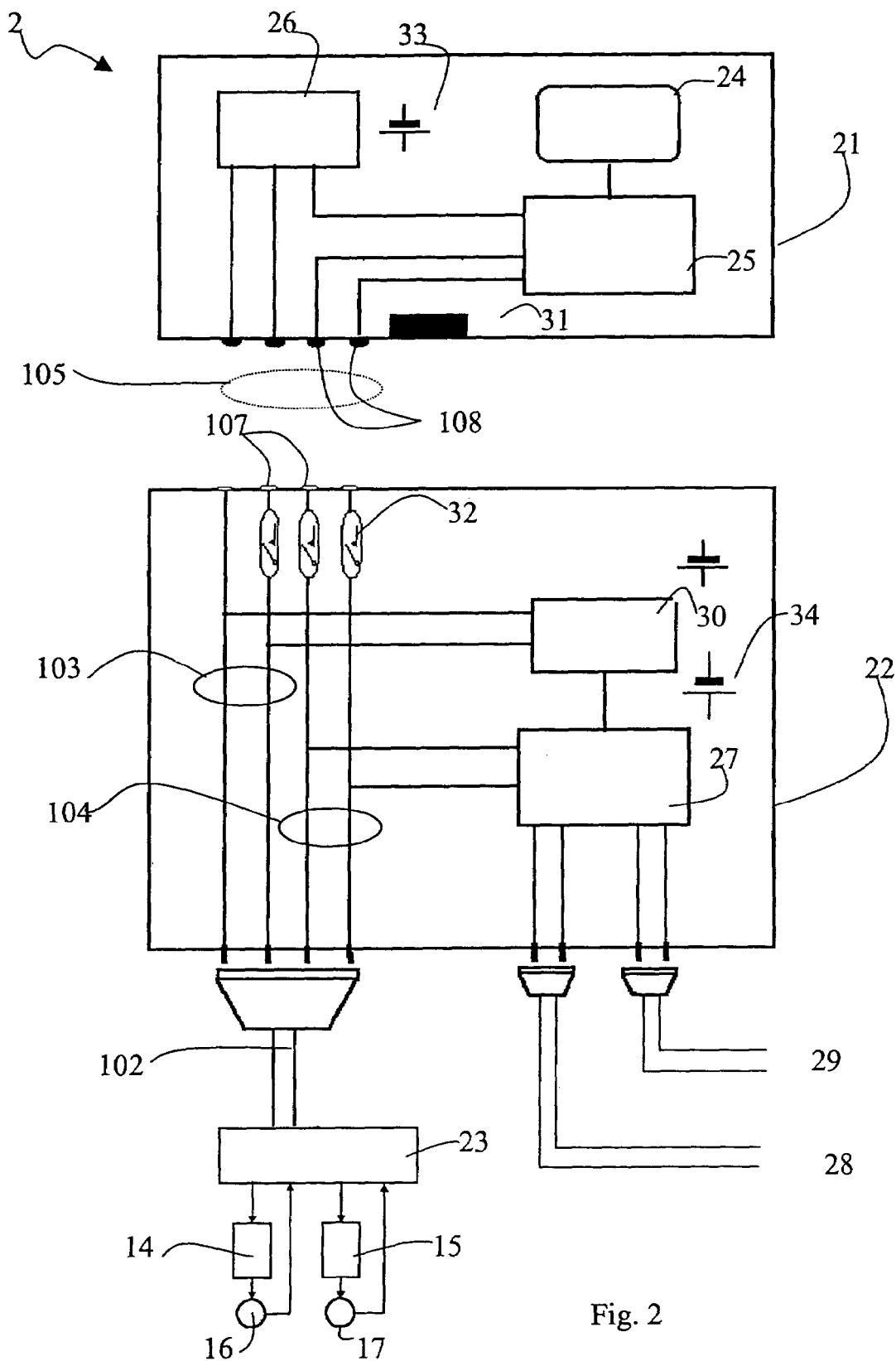
FIG. 2 is a partial schematic circuit diagram of a system for controlling the operating functions of a cycle according to the invention in a second configuration of operation

FIG. 2 shows the display unit 21 removed and displaced with respect to the control unit 22 by a distance such that the magnet 31 no longer exerts its force on the magnetic switches 32, which are in an opening position.

In particular, even though the contacts 107 remain uncovered and exposed, the corresponding conductors that belong to the supply bus 103 and to the communication bus 104 cannot, for example, be short-circuited by humidity that has condensed on top of the contacts 107. Said contacts 107 are in fact physically separated and isolated from the aforesaid conductors of the communication bus 104 and of the supply bus 103.

There is thus prevented any battery discharging phenomena through the connection 105. Likewise, any electrostatic charge transfer phenomena, through the connection 105, to the buses 103 and 104 and to the devices associated to them is prevented.

In the example illustrated, said conductor is, in fact, the ground conductor of the supply bus 103, which is unlikely to be able to give rise to the adverse phenomena referred to previously, also because the three reed switches in any case prevent formation of a return line. It is, however, clear that both of the conductors of the supply bus 103 may be provided with switches such as the switches 32.

Figure 3:
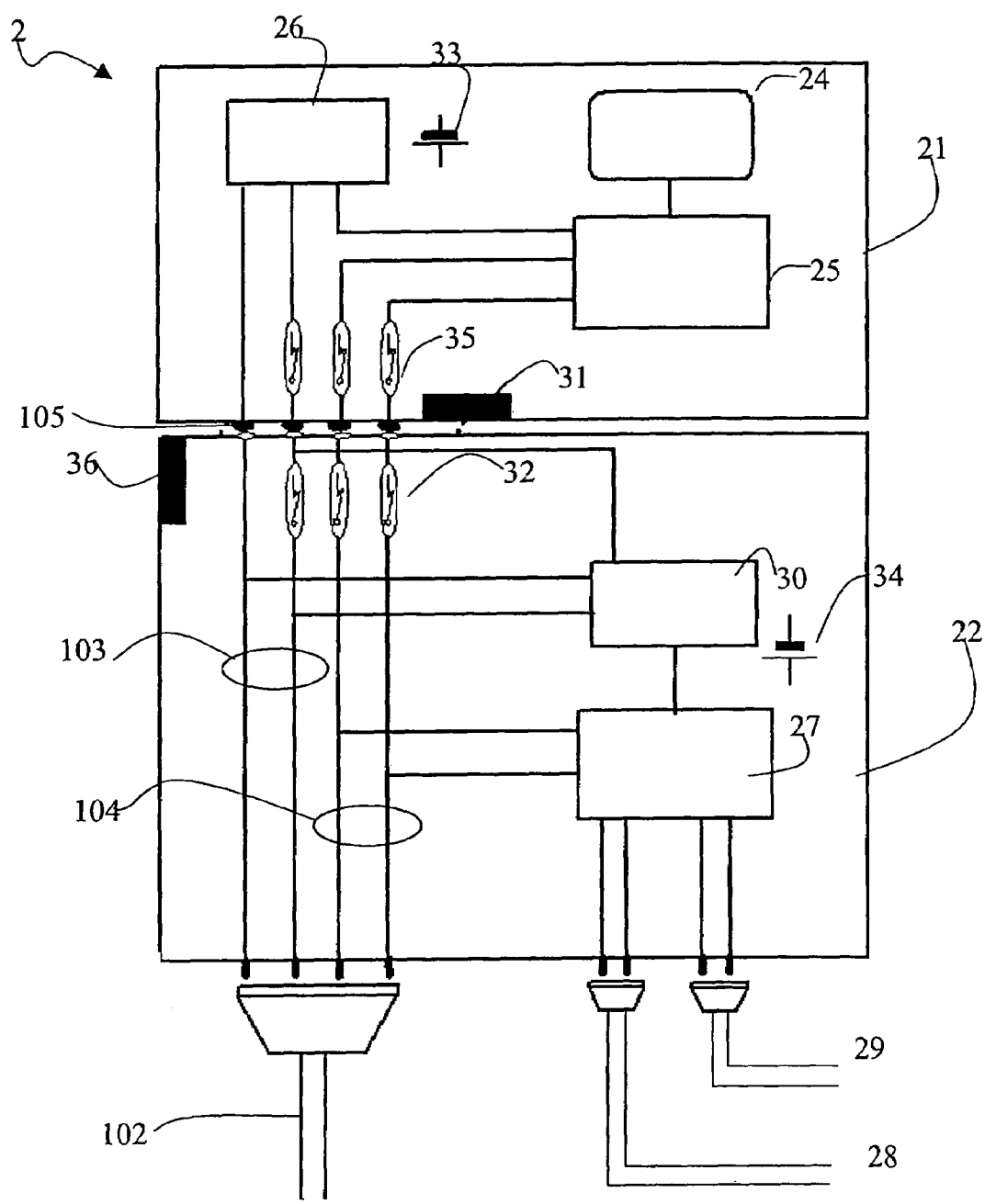
FIGS. 3 and 4 show alternative embodiments of the solution described in FIGS. 1 and 2.
Figure 4:
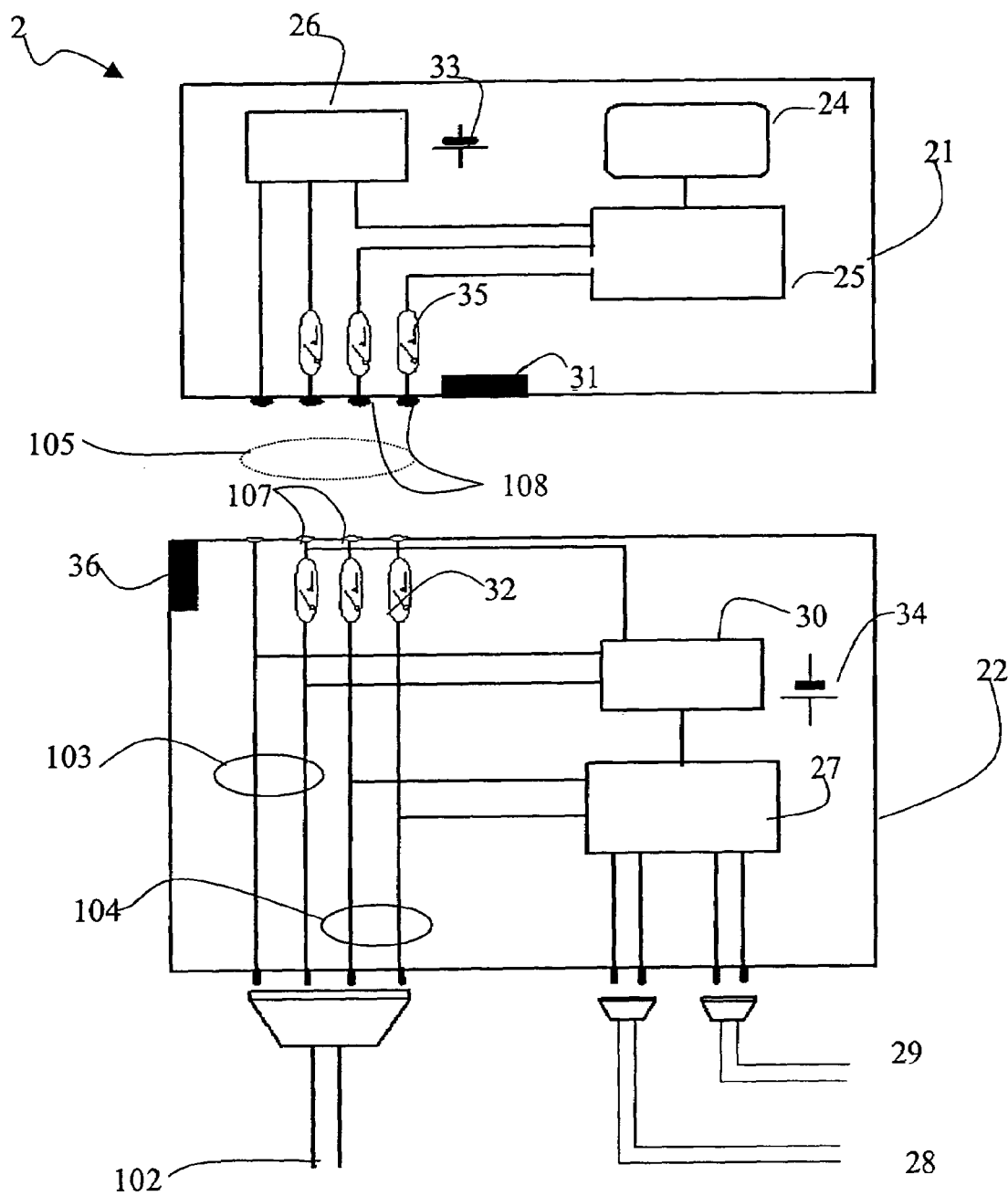

The variant embodiment illustrated in FIGS. 3 and 4 (corresponding, respectively, to FIGS. 1 and 2 in general terms) adopts the same circuit scheme described previously. For this reason, the same references that already appear in FIGS. 1 and 2 have been adopted in FIGS. 3 and 4. FIGS. 3 and 4 show that the contacts (distal ends) 108 of the connection 105 located on the display unit 21 are similarly protected as those on the control unit. Also in this case, the mechanism of protection—based upon the physical isolation of the contacts 108 from the unit 21 and the components that are located inside it—uses a plurality of switches 35.

For this embodiment, the switches (preferably of reed bulbs) are, however, located on the display unit 21 so as to enable their operation by a magnet 36 placed on the control unit 22. Consequently, when the display unit 21 is mounted on the cycle, the two units 21 and 22 are close to one another and, just as the magnet 31 keeps the switches 32 closed, the magnet 36 keeps the switches 35 closed. The connection 105 consequently presents an electrical continuity feature, fully performing its function.

Conversely, when the display unit 21 is removed from the cycle, the two units 21 and 22 are moved away. The magnet 31 is no longer able to keep the switches 32 closed, and the magnet 36 is no longer able to keep the switches 35 closed. With the switches 32 and 35 open, the contacts 107 and 108, which have remained exposed as a result of removal of the display unit 21 and interruption of the connection 105, are thus physically isolated from the respective units.

Regarding the choice of the number and arrangement of the switches 35, the positions of installation of the magnets 31 and 36 are chosen in such a way that the magnets are not reciprocally affected, in particular, to prevent the magnet 36 from keeping the contacts 32 stably closed, and/or the magnet 31 from keeping the contacts 35 stably closed.

The system for controlling the operating functions of a cycle proposed herein enables automatic insulation of the points of connection on the control unit and/or on the display unit to be achieved through an interruption of the physical continuity of the signals from and towards the outside of said units.

Advantageously, the insulation obtained by the system according to the invention does not prevent the control unit and the power unit from operating independently.

The use of magnetic switches in the form of reed-bulb switches is particularly advantageous on a cycle, since it is exposed to considerable vibrations, and the reed switches should be resistant to such vibrations. In addition, the magnet on the display unit and/or on the control unit is an inexpensive device that does not require any sort of power supply.

However, the reed-bulb switches may be replaced by magnetic or electromechanical devices, such as other types of mobile-element relays or Hall-effect-sensor relays, or else by switches, in particular switches controlled by means of other types of signal, such as an optical signal or a radio-frequency signal, or other types of sensors or proximity devices designed for inducing switching of a remotely located switch.

The magnetic switches set on the control unit 22 and/or display unit 21 and the magnet placed on the display unit 21 and/or control unit 22 realize a proximity switching device that is activated for switching when the display unit 21 is removed or else installed on the cycle. Such a device may be built in a functionally equivalent way in many different forms.

By way of example (and without wishing in any way to exhaust the field of possibilities), the following solutions may be used:

proximity switches of a mechanical type;
proximity switches of the solid-state type, such as photoemitter-photodetector pairs;
optical switches, such as photocells or photodetectors in general, which are able to be exposed or obscured according to whether the display unit 21 is removed or else mounted on the cycle;
electromagnetic-field or ultrasound proximity sensors.

The control system may be designed so that the control unit 22 detects opening of the switches caused by removal of the display unit 21 and in said conditions, prevents operation of the system itself. Alternatively, the control unit 22 may be configured for detecting opening of the magnetic switches and implementing a set of basic locomotion functions, such as gear-shifting and derailleur-shifting, ensuring execution thereof in conditions of removal of the display unit from the cycle.

From what has been set forth above, it follows that, without prejudice to the principle of the invention, the details of implementation and embodiments may vary widely with respect to what is described and illustrated herein, without thereby departing from the scope of the present invention, as defined by the annexed claims.

What is claimed is:

1. A unit electrically connected to, and selectively removable from, a complementary unit for controlling the operating functions of a cycle, so that said electrical connection can be decoupled by leaving exposed at least one distal contact part both of said units wherein the electrical connection is at least one switch that can be selectively actuated for electrically insulating said exposed distal contact part from either of said units.

2. The unit of claim 1 wherein the operation of said switch is dependent upon the proximity of said complementary unit to said unit.

3. The unit of claim 1 wherein said switch electrically connects said unit to said distal contact part when said unit and said complementary unit are near to one another.

4. The unit of claim 1 wherein said electrical connection is a multiwire electrical connection that can be decoupled by leaving exposed a plurality of distal contact parts on said unit, and in that associated to said electrical connection is a plurality of switches that can be selectively operated when said unit and said at least one complementary unit are moved away from one another, and wherein when said unit and complementary unit are moved away from one another, the exposed distal contact parts are electrically insulating from said unit.

5. The unit of claim 4 wherein at least one line of said multiwire electrical connection extends with continuity towards the respective distal part in absence of said switch.

6. The unit of claim 1 wherein said electrical connection is inserted in at least one bus.

7. The unit of claim 5 wherein said line, which extends with continuity, is a ground line of said at least one bus.

8. The unit of claim 1 wherein said switch is a reed switch that can be operated by a magnet.

9. The unit of claim 1 wherein said switch is mounted in a position such that, with said unit and said complementary unit co-operating together, the switch is in proximity with complementary unit so that the proximity operates by an actuation element that is placed on said complementary unit.

10. The unit of claim 1 wherein the unit is configured for stable installation on said cycle.

11. The unit of claim 1 further comprising at least one actuation element for operating at least one switch present in said complementary unit.

12. The unit of claim 11 wherein said actuation element is positioned so as to interact with a corresponding actuation element present in said complementary unit.

13. A complementary unit for controlling the operating functions of a cycle, designed for co-operating with at least one unit comprising:
   at least one actuation element for a switch that can be selectively actuated for electrically insulating said exposed distal contact part from either or one of said units.

14. The complementary unit of claim 13 wherein the actuation element is a magnet.

15. The complementary unit of claim 13 wherein the complementary unit is selectively removable from said cycle.

16. The complementary unit of claim 13 wherein the complementary unit is configured as a display unit that visually communicates with a user.

17. The complementary unit of claim 13 wherein the switch can be selectively actuated for electrically insulating said exposed distal contact part of said units.

18. A control unit for controlling the operating functions of a cycle, the control unit being removably connected to a display unit that communicates with a user, the control unit removably electrically connected to the display unit through control unit contacts and display unit contacts, wherein removal of the display unit from the control unit disconnects the electrical connection and insulates the control unit contacts.

19. The control unit of claim 18 further comprising a magnet in the display unit that closes a magnetic switch in the control unit when the magnet is in proximity to the control unit, wherein when the magnetic switch is open, the contacts are insulated, and when the magnetic switch is closed, the contacts are exposed.

20. The control unit of claim 19 further comprising a magnet in the control unit that closes a magnetic switch in the display unit when the magnet is in proximity to the display unit, wherein when the magnetic switch is open, the display unit contacts are insulated, and when the magnetic switch is closed, the display unit contacts are exposed.

21. The control unit of claim 19 wherein the magnetic switch is a reed switch.

22. The control unit of claim 19 wherein the operating functions of the cycle includes operating an actuator.

23. The control unit of claim 22 wherein the actuator operates a derailleur on the cycle.

24. A control unit for controlling the operating functions of a cycle comprising a display unit that closes a switch in the control unit and when the display unit is in a proximity to the control unit, and when the switch is closed, the contacts are exposed, and when the display unit is outside of the proximity of the control unit, the switch is open and the contacts are insulated.

25. The control unit of claim 24 wherein the switch is selected from the group consisting of: reed-bulb switches, magnetic switches, mobile-element relays, Hall-effect-sensor relays switches, optical signal switches, and radio-frequency signal switches.

26. A system for controlling the operating functions of a cycle, the system comprising:
   at least one display unit that provides information regarding the functional operation of a cycle in human readable form;
   at least one control unit which is capable of a functional connection with and an exchange of operational information with the at least one display unit regarding the cycle's locomotion functions; and
   a connection between the display and control units that is comprised of a switch that is selectively operable between opened and closed positions in a one of the units and a switch control for selectively operating the switch between the opened and closed positions in the other of the units,
   whereby the units may be selectively electrically connected together or insulated from each other.

* * * * *